(12) United States Patent
Johnson

(10) Patent No.: US 6,624,757 B1
(45) Date of Patent: Sep. 23, 2003

(54) SHELF PRICING DISPLAY APPARATUS

(76) Inventor: Neldon P. Johnson, 512 S. 870 East, American Fork, UT (US) 84003

( * ) Notice: Subject to any disclaimer, the term of this patent is extended or adjusted under 35 U.S.C. 154(b) by 0 days.

(21) Appl. No.: 09/547,636

(22) Filed: Apr. 12, 2000

(51) Int. Cl.[7] ............................................. H04Q 1/00
(52) U.S. Cl. ........................... 340/825.52; 340/5.91; 345/1.2; 345/2.1; 345/2.3; 345/3.1; 700/238; 705/20
(58) Field of Search ..................... 340/825.52, 5.91; 235/383, 385; 705/20; 345/1.2, 2.1, 2.3, 3.1; 700/238

(56) References Cited

U.S. PATENT DOCUMENTS

| | | | |
|---|---|---|---|
| 4,002,886 A | * | 1/1977 | Sundelin ..................... 235/383 |
| 4,139,149 A | * | 2/1979 | Crepeau et al. ............. 235/383 |
| 5,401,947 A | * | 3/1995 | Poland ........................ 235/383 |
| 5,861,817 A | | 1/1999 | Palmer et al. .............. 340/5.91 |
| 5,910,653 A | | 6/1999 | Campo ................... 250/214 AL |
| 5,979,758 A | | 11/1999 | Swartz et al. ................ 235/383 |
| 5,995,015 A | | 11/1999 | DeTemple et al. ...... 340/825.49 |
| 6,307,919 B1 | * | 10/2001 | Yoked ......................... 235/385 |

* cited by examiner

*Primary Examiner*—Michael Horabik
*Assistant Examiner*—Yves Dalencourt
(74) *Attorney, Agent, or Firm*—J. David Nelson

(57) ABSTRACT

An electronic display strip is attached to the shelf front of retail shelves, each shelf having an address code assigned through a control computer. Display fields of variable locations and lengths within each display strip are assigned to each product on a shelf through the control computer. Shelf and display field address codes, product information and product price information are transmitted on a continuous or intermittent basis by the control computer through a communications link to signal processors at each display strip. A control circuit for the display strip stores the information in a display memory and energizes the display field matching the display field address code for the product, thereby displaying the product information and product price in the display field.

2 Claims, 3 Drawing Sheets

SHELF PRICING DISPLAY APPARATUS

FIELD OF THE INVENTION

The present invention is in the field of electronic displays and more particularly in the field of electronic pricing and product identification displays for retail shelving.

BACKGROUND OF THE INVENTION

Retail product identification and product price are typically displayed on a store shelf in the form of plastic or paper tags and require constant intervention from store employees to keep the tags matched to the products and the prices accurate and up to date. In addition to product name and price, these shelf tags may also contain a UPC (uniform product code) bar code for the product as well as a computed price per ounce. The tags must be reprinted as prices change and must be manually relocated from shelf to shelf as products are relocated. Because of the difficulty and time consuming nature of the manual shelf tag system used by most stores, the tags are often improperly located and pricing is often outdated.

The device disclosed in U.S. Pat. No. 4,500,880 to Gomersall is an attempt to deal with some of the limitations of manual shelf tags. That device consists of an electronic shelf tag which displays the price of the item associated with the tag. Each shelf tag is assigned to a product and the UPC code of the product is the address of the shelf tag displaying the price of the product. A computer is used to download address and price information to an "EPROM" device which is used on a product-by-product and tag-by-tag basis to adjust the information displayed by each tag as product addresses or prices change. One of the main limitations of that device is that the price changes are still accomplished manually, albeit electronically. Furthermore, each tag must be physically addressed to a specific product manually, and this is done through use of the UPC code for the product. If the product is moved or changed then the tag must be physically moved or changed to match the new location or product. This process requires labor and is also prone to human errors. Also, the problem of being moved by unauthorized persons remains. Finally, since one of the electronic tags is required for each product, the cost would likely be prohibitive for a typical retail store.

Similarly, the apparatus disclosed in U.S. Pat. No. 5,861,817 to Palmer is an attempt to provide an electronic tag which is more easily updated, but this apparatus also requires interface between the tag and a hand held unit operated by a store employee.

It is an object of the present invention to provide a product information and price display device for retail product shelves which provides completely automated product information and price display.

It is a further object of the present invention to provide a product information and price display for retail product shelves which does not have to be relocated as products are relocated within the store.

It is a further object of the present invention to provide a product information and price display for retail product shelves which is controlled entirely by a central computer.

It is a further object of the present invention to provide a product information and price display for retail product shelves which requires no manual interaction by store personnel.

It is a further object of the present invention to provide a product information and price display for retail product shelves which can provide product and price information for multiple products.

It is a further object of the present invention to provide a product information and price display for retail product shelves which can provide product and price information for an entire shelf section length.

It is a further object of the present invention to provide a product information and price display for retail product shelves which provides for product and price display for a variable number of products.

It is a further object of the present invention to provide a product information and price display for retail product shelves which provides for the display of product and price information at variable positions in variable display fields on the display.

It is a further object of the present invention to provide a product information and price display for retail product shelves which provides for the location reassignment and re-pricing of products through interaction with a central computer only.

It is a further object of the present invention to provide a product information and price display for retail product shelves which is economically feasible for a typical retail store.

SUMMARY OF THE INVENTION

Each shelf on each gondola in a retail store is assigned a unique shelf address code through a control computer. An electronic display strip of the present invention is attached to the shelf front of each shelf. The electronic display strip can be an LCD, an LED or a plasma display. Display fields of variable locations and lengths within each display strip are assigned to each product on a shelf. The display field for each product has a unique address code based upon the location and length of the display field within the display strip. Shelf and display field address codes, product information and product price information are transmitted on a continuous or intermittent basis by the control computer through a communications link to signal processors at each display strip. If the shelf address code of a display strip matches the assigned shelf address code of a product, the display field address code, product information and price information are passed to a control circuit for the display strip which stores the information in a display memory and energizes the display field matching the display field address code for the product, displaying the production information and product price in the display field.

While the electronic display field of the present invention can be of any length, it is typically the full shelf length. This is typically approximately four feet for most common shelf units. Through the control computer, the shelf and display field assigned to a particular product can be changed readily as a product is relocated in the store from aisle to aisle, gondola to gondola, or shelf to shelf. Product and price information can also be readily updated. Once a display strip is in place no further physical manipulation of the strip is require. All changes are handled through the control computer. Because the display strip covers the whole shelf, several products can be displayed by each display at the same time. The control circuitry for each display strip can display several items at the same time on the display strip, the number being limited by the amount of space required for each product. This invention makes it possible to control product information and pricing display at the shelf level completely without human intervention at the shelf level.

The communication link between the control computer and each display strip may be accomplished through hard wire connection, wireless communication such as cellular telephone or through LAN's and telephone lines and the control computer may be located at the retail store or may be located at a central location from which multiple stores can be controlled. With centralized control, local store employees will no longer be required to concern themselves with pricing at the local level. This will reduce labor costs and provide for more accurate pricing.

The product information transmitted and displayed can include descriptive information such as cost per unit weight and can identify a product as a sale item with the price savings identified.

DETAILED DESCRIPTION OF PREFERRED EMBODIMENTS

Figure 1:
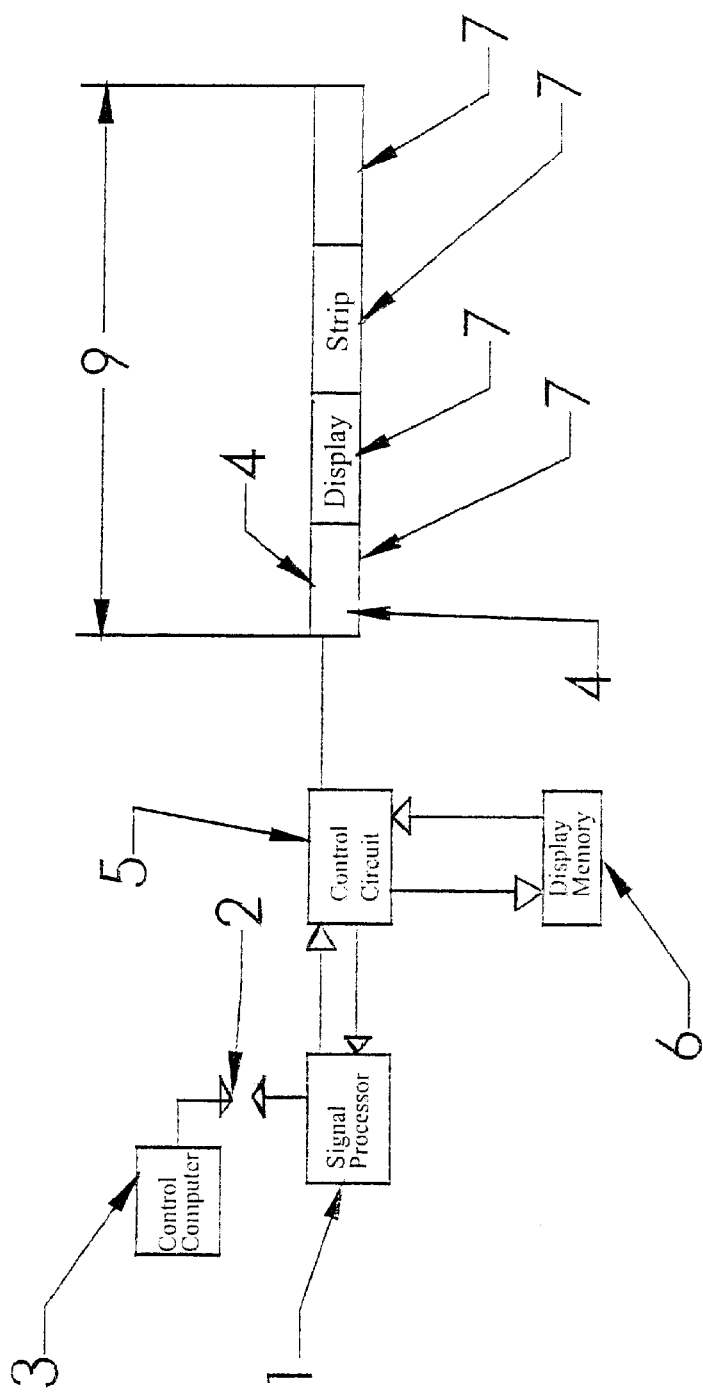
FIG. 1 is a block diagram of the display apparatus of the present invention.

Referring to FIG. 1, a signal processor 1 receives, by a communication link 2 with a control computer 3, an address code for an electronic display strip 4. The signal processor determines if the address code received from the control computer is correct for this display strip. If so, then display field, product identification and pricing information for a particular product is transmitted by the control computer through the communication link to the signal processor. The information is checked by the signal processor for error through an error correction program. After information is determined to be acceptable by the signal processor, it is passed to the control circuit 5. The control circuit stores the information in the display memory 6 and determines which display field 7 in the display strip is the correct display field for the product, based upon the display field code received from the control computer for the display field assigned to the product. The control circuit then energizes the correct display field in the display strip, displaying the product information and price for the corresponding product.

The communications link can be by direct or indirect connection through wire or wireless connection through a LAN, telephone system, or other common communications devices.

Figure 2A:
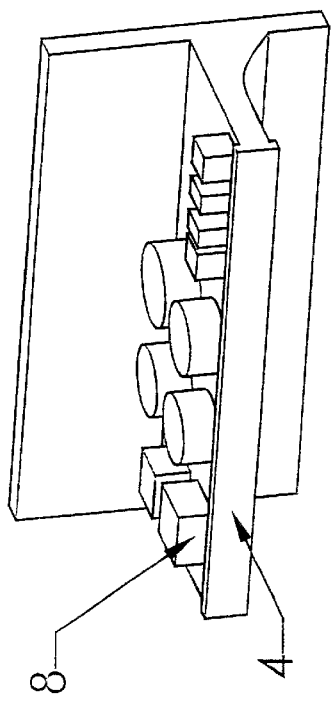
FIG. 2a is a front perspective view of a shelf with a full length display strip of the present invention.
Figure 2C:
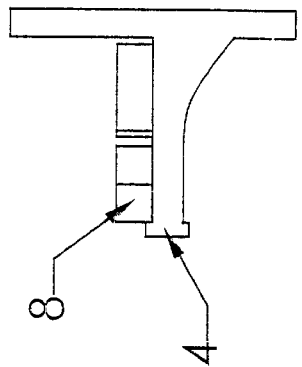
FIG. 2c is a side view of a shelf with a full length display strip of the present invention.
Figure 2B:
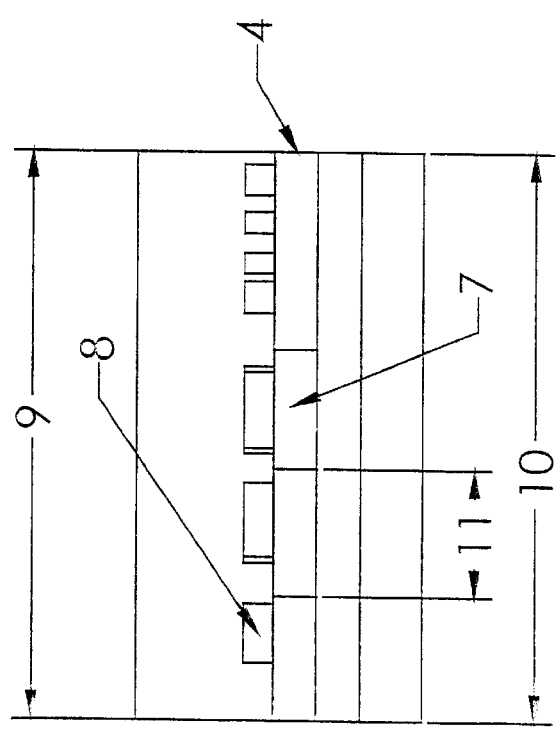
FIG. 2b is a front view of a shelf with a full length display strip of the present invention.

The display strip can be an LCD, an a LED, a plasma display or other similar electronic display device. However, an LCD is particularly well suited for the present invention since it can made in any length, is easily adaptable to variable display fields lengths, and is economical. Referring to FIGS. 2a, 2b and 2c, variable display strip lengths 9 are important in that they allow a single display strip to span the entire shelf length 10. Adjustable display fields of variable lengths allow the display strip to accommodate varying lengths of shelf spaces 11 occupied by products 8.

Figure 3:
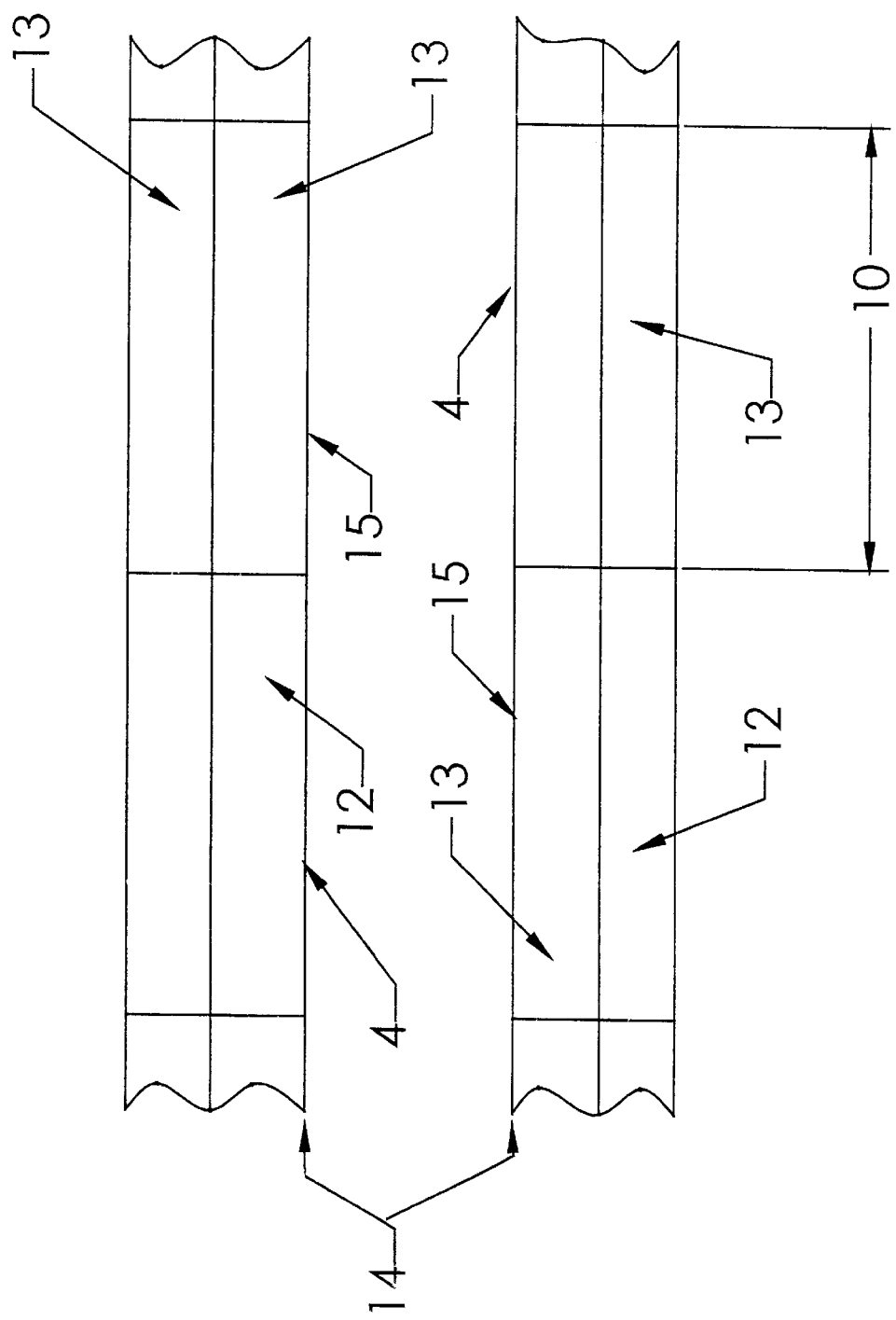
FIG. 3 is a top view of an area of a typical retail store illustrating a typical shelf arrangement with full length display strip of the present invention.

Referring to FIG. 3, a typical area of a retail store with product shelving is illustrated. Typical shelf gondolas 13 are separated by an aisle 14. An electronic display strip 4 may be affixed to the shelf front 15 of each of shelves 12 of the gondola. For preferred embodiments each electronic display strip extends for a complete shelf length 10. The electronic display strip can be of any length to match the length of the shelf.

Other embodiments and other variations and modifications of the embodiments described above will be obvious to a person skilled in the art. Therefore, the foregoing is intended to be merely illustrative of the invention and the invention is limited only by the following claims.

What is claimed is:

1. Apparatus for displaying product information and price for a plurality of retail products on a shelf of a retail store comprising:
   a) electronic display strip having a plurality of adjustable display fields, each display field having a variable length to match the length of the shelf space occupied by the corresponding product;
   b) computing means for assigning the electronic display strip a unique strip address code based upon location within the store, assigning each of the adjustable display fields within the electronic display strip a unique field address code based upon location within the display strip and the length of the display field, assigning each product on the shelf the strip address code corresponding to the shelf and the field address code corresponding to the field address code of the display field where the product is located on the shelf, and storing and transmitting product information and price of each product;
   c) communicating means for transmitting product information and price for each product on the shelf from the computing means to the electronic display strip; and
   d) display energizing means for displaying the product information and price in the display field corresponding to the product.

2. Apparatus for displaying product information and price for a plurality of retail products on a shelf of a retail store comprising:
   a) electronic display strip having a plurality of adjustable display fields, each display field having a variable length to match the length of the shelf space occupied by the corresponding product and each display field having a field address code which includes information identifying the length of the display fields;
   b) control computer;
   c) signal processor;
   d) communication link; and
   e) control circuit.

* * * * *